March 17, 1953
F. C. SCHUELER
2,631,643
APPARATUS AND PROCESS OF PRODUCING
DECORATIVE FLOOR COVERING
Filed June 7, 1948
3 Sheets-Sheet 1
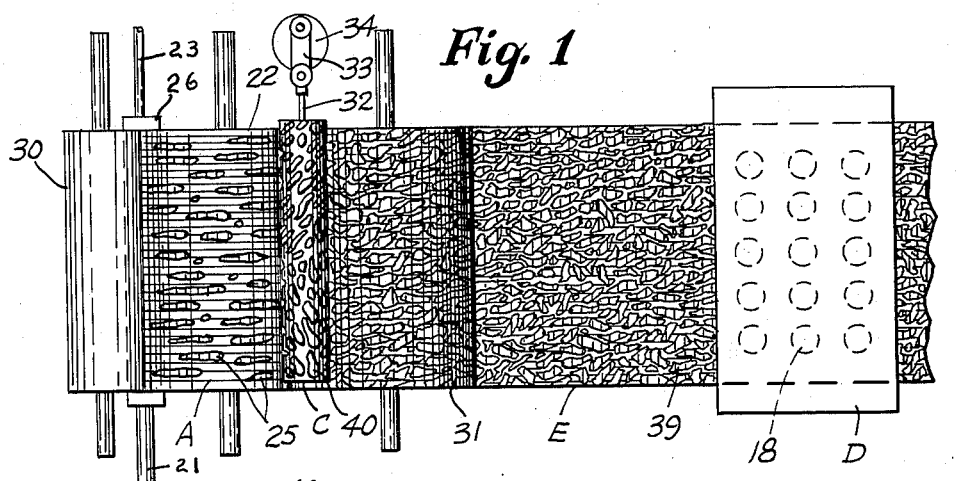
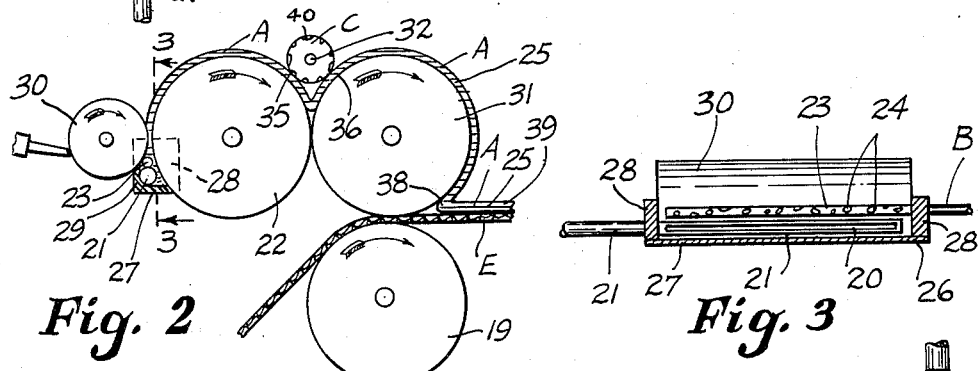
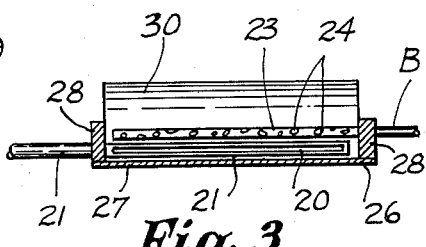
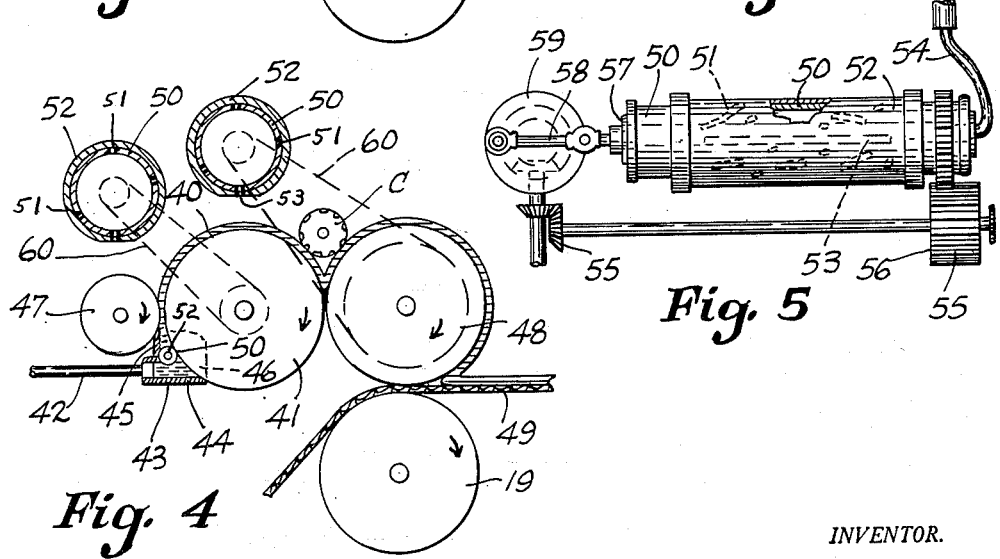
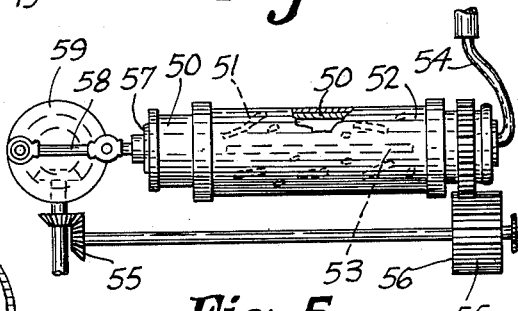
INVENTOR.
Fred Charles Schueler
BY Pearson + Pearson
attorneys.

March 17, 1953 F. C. SCHUELER 2,631,643
APPARATUS AND PROCESS OF PRODUCING
DECORATIVE FLOOR COVERING
Filed June 7, 1948 3 Sheets-Sheet 2

INVENTOR.
Fred Charles Schueler
BY Pearson + Pearson
attorneys

March 17, 1953 — F. C. SCHUELER — 2,631,643
APPARATUS AND PROCESS OF PRODUCING DECORATIVE FLOOR COVERING
Filed June 7, 1948 — 3 Sheets-Sheet 3
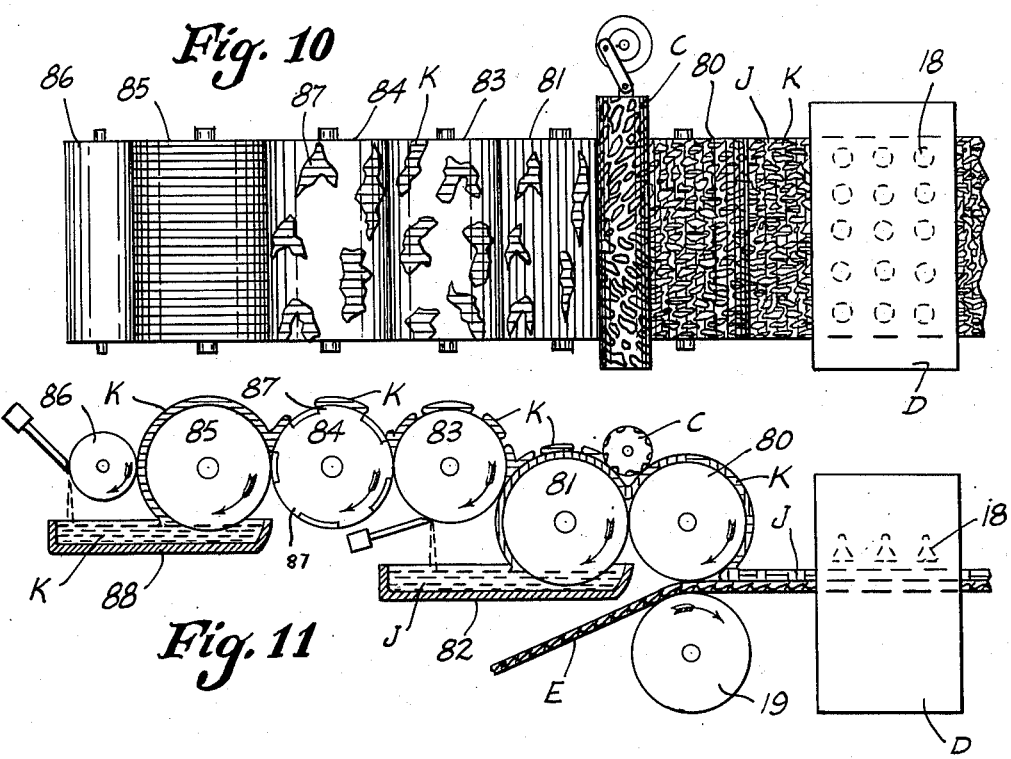
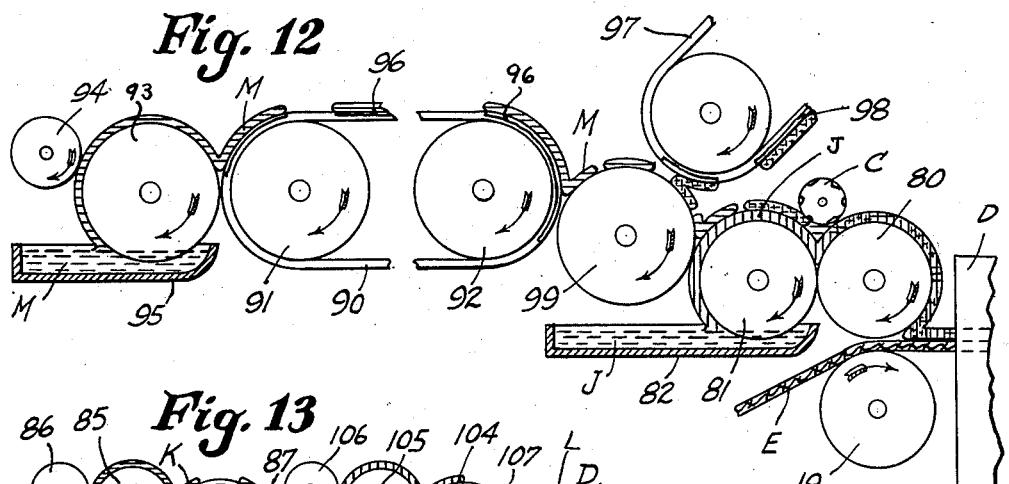
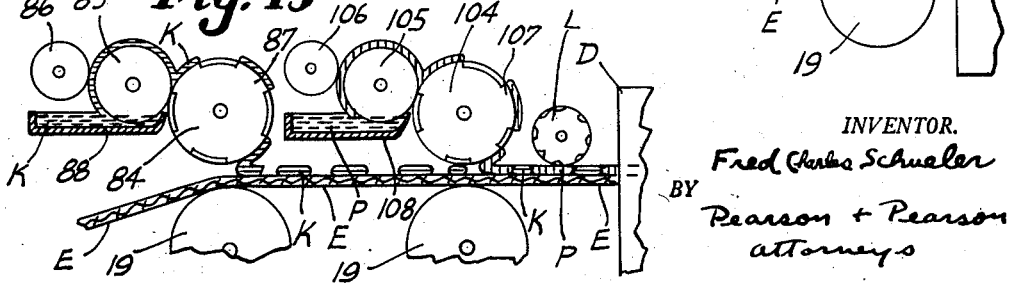
INVENTOR.
Fred Charles Schueler
BY Pearson + Pearson
attorneys Patented Mar. 17, 1953

2,631,643

UNITED STATES PATENT OFFICE 2,631,643

APPARATUS AND PROCESS OF PRODUCING DECORATIVE FLOOR COVERING

Fred Charles Schueler, Fulton, N. Y., assignor to The Schueler Engineering Co., a partnership Application June 7, 1948, Serial No. 31,486

12 Claims. (Cl. 154—20)

1

This invention relates to a new covering material and to methods of, and apparatus for the manufacture of the same from viscous, flowable plastic of contrasting colors. It is particularly useful in the manufacture of floor coverings, or the like, with a base layer of felt and a decorative upper layer of hardened plastic. By my method and apparatus such plastic surfaced covering material is produced continuously, rather than intermittently. The plastic colors are inlaid into the upper plastic layer and the colors may be mottled to give a marbelized effect much desired in the trade.

The term "mottled" is used herein to denote a covering material having a multicolored decorative surface composed of spots, patches or blotches of different colors or shades of a color which have been smeared into streaks or veins of the appearance of marble and which are not in an accurate repeat pattern. I use the term "variegated" to mean a covering material having a multicolored surface composed of patches of different color, or shades of a color, each patch having a predetermined outline and located in a defined portion of the design to form a repeat pattern. My repeat variegated patterns may be in a marbelized design or may be flowers, geometric figures or other suitable decorative effects.

I can use any of the thermosetting or thermoplastic plastics in my apparatus, and can harden or set them by suitable well known methods such as a heating oven in the case of a thermoset plastic or a chilling device in the case of a thermoplastic plastic. I prefer to use thermosetting plastics, however, which are in what I call a viscous, flowable condition prior to being hardened.

I am aware that coatings have been applied to sheets or webs of material by flat bed intermittent methods and that coatings have been applied to continuous webs of material by reverse coating rolls. I am also aware that multicolor printing of patterns on sheets or webs of material has been accomplished by flat bed or rotary methods. I believe, however, that I am the first to discover that a layer of viscous flowable plastic in a background color can be formed on rolls, that viscous flowable plastic in other colors can be deposited on the layer, the layer and deposits can then be smoothed by reverse coating onto a moving web and then hardened on the web in a continuous rotary process.

My process and apparatus is particularly adapted to producing a marbelized pattern in plastic. I have discovered that viscous flowable plastic

2 can be deposited in streams or spots of color on my roll-carried moving layer of viscous flowable plastic in a background color, that the colored deposits can be smeared by what I call a "mottling member" to give the effect of marble and the "marbelized" layer can then be smoothed into a uniform layer by reverse coating it into a moving web of backing material. The "mottling member" may be a roll with a soft surface having suitable cavities or may be a brush roll made up of irregularly spaced tufts with bristles of unequal length. It is located in contact with the upper surface of the marbelized layer, preferably in the nip of two adjacent rolls of equal diameters and equal surface speeds. The mottling member may revolve and reciprocate or may only revolve and it may have one or may have two points of contact with the viscous flowable plastic as desired.

The spots and streams of color deposited on my moving layer, tend to sink into the layer due to the viscosity and flowability of the plastics, but may also be forced into the layer by applying suitable pressure to the mottling member. I can thus secure a design in colored plastic in which the colored elements are imbedded in the background color and if desired can cause them to be sufficiently inlaid to form a distinct pattern on the underside of the layer as well.

By the term "deposit" I mean projecting viscous flowable plastic in color from an orifice onto the moving layer or to mean applying viscous flowable plastic in color by means of a roll or belt onto the moving layer.

In depositing plastic by projection I use a member having one or more orifices located over the moving layer so that the discharge of viscous flowable plastic will fall on the moving layer of plastic which is in a background color. I may use a hollow perforated tube for this purpose and may cause it to reciprocate or revolve or both and may enclose it in a hollow tubular sleeve having a discharge slot. I may also use a perforated container of plastic or may use a screen, adapted to move with relation to the layer, so as to distribute the droplets passing therethrough from a spray of plastic directed against the screen. I prefer however to use one or more pipes, mounted to reciprocate transversely above the layer so that a jet or stream of viscous, flowable plastic will be discharged from the orifice of each pipe onto the moving layer, forming streaks which are smeared by my mottling member to give the appearance of veins or striations of marble. I thus secure what I call a "mottled" pattern.

In depositing plastic by application, I use rotating endless design members, which preferably revolve in reverse coating relationship to my roll-carried moving layer of viscous flowable plastic. The design members may be rolls or endless belts upon which a design has been formed in cameo or intaglio and the design may be distorted in circumferential length in accordance with the speed of the design member and the speed of the member to which the plastic is transferred. I thus secure a variegated pattern which is composed of accurately repeated design elements.

The viscous flowable plastics use in my invention are assembled into colored patterns while in the viscous flowable condition, by the use of a plurality of rolls arranged in reverse coating relationship to form a moving player. By reverse coating relationship I mean that the adjoining faces of each pair of rolls move in opposite directions. Thus a film of plastic is carried around the upper half of a roll to the nip at the next roll, at which point the film is picked up by that next roll and carried around the upper half thereof to the next succeeding roll. Each roll therefore reverse coats its film of plastic onto the adjacent roll and an undulating moving layer of plastic is formed on the upper halves of all of the rolls in the series or battery. I have also discovered that rolls of various diameters can be used thus forming an undulating moving layer of the background plastic, fed to the rolls from a coating pan or extrusion slot, the undulations being of different proportions. By suitably locating my plastic projection devices, I can vary the resulting mottled patterns as desired by projecting onto the top of an undulation to secure a deposit of regular outline or projecting onto the side of undulation to secure an elongated deposit.

I may use any one of my depositing devices or a combination of them, depending on the desired pattern and I may locate them in various positions relative to the undulating moving layer to give variety in the pattern. I may use distorted design members, rotate the various rolls at different speeds relative to each other and to the moving plastic-receiving member, and may or may not use a mottling member depending on the particular pattern desired.

It is obvious that after my colored pattern in viscous flowable plastic has been transferred to the plastic-receiving member and passed thereon through a plastic-hardening device, that the plastic-receiving member may then be stripped off, if desired, leaving a covering material entirely of plastic with a through and through or mosaic pattern.

My apparatus and process does not require the use of doctor blades or doctor rolls to smooth the plastic after being deposited on the plastic-receiving member by reverse coating as is the case with prior inventions. I have found that by rotating my final reverse coating roll at a speed substantially greater than the speed of the plastic-receiving member, the viscous flowable plastic is piled up at the point of transfer and emerges therefrom in a smooth layer of uniform thickness ready to be hardened.

My plastic-receiving member may be a web of felted or woven fabric or the like and may be treated or untreated with asphalt or similar material intended to increase its vapor and liquid resistant qualities. I prefer to use untreated felted material and to make the same vapor resistant after the plastic hardening process has been completed. For example by saturating the felt with asphalt or the like, as explained in my copending application.

I can, of course, deposit my colored viscous flowable plastic directly on such a plastic-receiving member, depending on the viscosity of the material, or depending on a suitable doctor member, to smooth the layer of plastic so formed. However, to secure the best results, I first form a roll-carried moving layer of the background plastic, then deposit a colored design of plastic on the moving layer and then transfer the assembled viscous flowable plastics to the plastic-receiving member by reverse coating. By so doing, I have discovered that designs can be assembled from flowable plastic of relatively high viscosity not usable in present flat bed processes. My continuous rapid method using rotory apparatus produces a covering material with a hardened plastic layer arranged in decorative colored elements of many patterns.

It is also obvious that instead of first forming a roll-carried plastic layer and then depositing plastic thereon, I can first deposit spots or streaks on the rolls, then cover them with a moving roll-carried layer and later bring the colored spots or streaks to the surface with my mottling member thus forming a pattern from the underside, through the layer, and onto the surface thereof. Similarly, I can deposit directly onto a doctor or other roll, which may not be carrying my moving layer, and then transfer the deposit to the surface of the layer by a coating contact of the roll with the layer.

In the drawings which are generally diagrammatic and which show the plastic films or coatings greatly exaggerated in thickness for the purpose of illustration, Fig. 1 is a plan view of one form of my invention showing the plastic-receiving member, the plastic hardening device, a background layer of plastic formed from an extrusion slot onto reverse coating rolls, a perforated pipe for depositing plastic and a mottling member.

Fig. 2 is a fragmentary side elevation of the device shown in Fig. 1.

Fig. 3 is a detail front view on line 3—3 of Fig. 2, showing the relation of the extrusion slot for the background layer and the perforated member for depositing colored plastic on the layer.

Fig. 4 is a view similar to Fig. 2, but showing a modified form of depositing device in three typical locations.

Fig. 5 is a detailed plan view of the plastic depositing device shown in various positions in Fig. 4, and illustrating the driving means therefor.

Fig. 10 is a plan view of another form of my device showing an endless design member in the form of a design roll and cross hatched to indicate differences in color.

Fig. 11 is a side elevation of the device shown in Fig. 10, and

Fig. 12 is a view similar to Fig. 11, showing an endless design member in the form of a design belt.

Fig. 13 is a view similar to Fig. 11 showing flowable plastic being deposited directly on a plastic receiving member rather than on a moving layer of flowable plastic.

Figure 6:
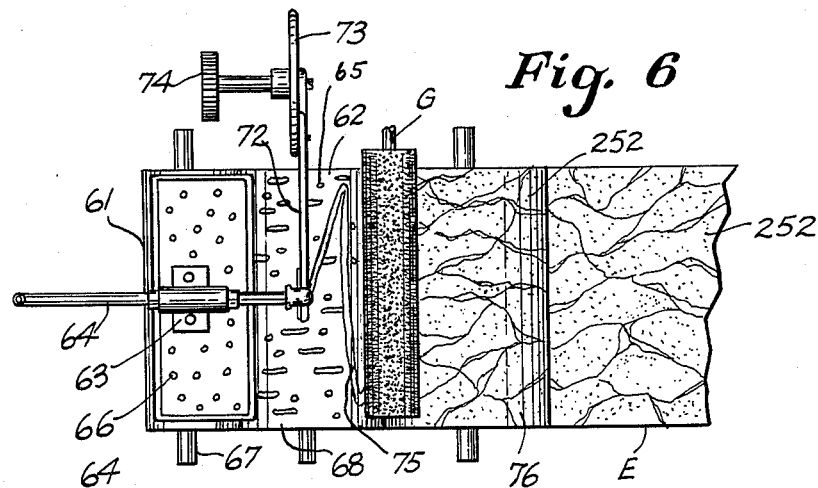
Fig. 6 is a fragmentary plan view similar to Fig. 1 and showing a moving layer formed from a coating pan on reverse coating rolls, a perforated container of colored plastic over a doctor roll and an applicator roll and a swinging pipe for discharging streams of colored plastic.

As shown in Figs. 1 to 3, I provide a plastic-hardening device D, such as an oven heated by infrared bulbs 18 or other means for thermosetting one type of viscous flowable plastic used in my invention. I also provide a web or plastic-receiving member E, carried by suitable rolls 19 and feeding into plastic hardening device D continuously at a uniform rate of speed. E may be a web of fabric, felt, foil, etc. and is preferably flexible for use as backing on floor covering or the like.

A stream of viscous flowable plastic, of a width to conform to the width of E and of a substantially uniform depth is continuously discharged from a slot 20 in a transverse supply pipe 21, against the surface of a roll 22. The plastic forms a layer A, in a background color, on the roll 22. A member B comprising a supply pipe 23, having irregularly spaced orifices 24, is located above and near pipe 21 and discharges droplets and streams 25 of viscous flowable plastic in another color onto layer A after it has been formed. Pipe 21 and pipe 23 are supplied with colored plastic from containers not shown, and the plastic is under pressure in a well known manner. As shown in Figs. 2 and 3, pipes 21 and 23 are enclosed by a casing 26, having a bottom 27, side walls 28, and a back 29. The edges of bottom 27 and back 29 are cut away to fit the surface of applicator roll 22 and doctor roll 30 and bear against the same to act as doctor blades and confine any waste plastic not picked up by the rolls.

The doctor roll is adjustable in any well known manner, so that a coating of the desired depth may be formed on applicator roll 22 by moving doctor roll 30 toward or away from 22.

Applicator roll 22 is thus first coated with a background layer A, then colored deposits are made thereon from orifices 24 after which the layer passes between roll 22 and roll 30. The doctor roll removes the surplus plastic because it revolves in the same direction as the applicator roll and may itself be stripped by suitable doctor blades while the layer and deposits continue on the surface of roll 22. The layer is transferred by reverse coating to what I call the printing roll 31, which in turn transfers the layer to the plastic-receiving member E by reverse coating.

I provide a mottling member C, preferably located in the nip of rolls 22 and 31 for dispersing and smearing the viscous flowable plastic colors 25 deposited on layer A. C may be a metal roll, covered with a yielding material such as "neoprene," into the surface of which irregularly shaped cavities 40 have been formed. The mottling member C revolves on a shaft 32 and is reciprocated transversely of the layer by an arm 33 pivoted to a revolving member 34 synchronized with the rate of travel of the layer. The mottling member may be counterweighted so that it is in "kissing" contact with the layer or may be pressed down or weighted down by suitable means to give a greater degree of smearing effect.

The viscous flowable background layer A and viscous flowable colored deposits 25 are smeared or mottled as they come in contact with C at 35, while on roll 22, and again at 36, while on roll 31, forming a marbelized design but with a roughened surface caused by the action of the cavities in C. However, as the plastic layer is transferred by reverse coating from roll 31 to web E, the greater surface speed of roll 31 with relation to the surface speed of E causes the plastic to pile up and form a layer on E of greater depth than when on the rolls. The piling up action, as 38, causes the surface of the layer to emerge smooth so that at 39 it is of uniform depth and ready to be passed through the hardening device D.

As shown in Figs. 4 and 5, I may form a background layer 40, on an applicator roll 41, by forcing plastic under pressure from a pipe 42 into a casing 43. Casing 43 has a bottom 44, a back 45, and side walls 46 forming a tight compartment with the surfaces of doctor roll 47 and applicator roll 41. As roll 41 revolves, it picks up a coating or film 40, which is smoothed by doctor roll 47 and is transferred to printing roll 48 and plastic receiving member 49 by reverse coating. Supporting rolls 19 are provided for 49 and a mottling member C is located in the nip of rolls 41 and 48.

Instead of a stationary perforated pipe such as 23, I may use a reciprocating and revolving pipe 50 having irregularly spaced and shaped orifices 51 for depositing viscous flowable plastic in color on a layer such as 40. A tubular sleeve 52, having a discharge slot 53 directed at layer 40, is fixed in place above the layer so that the discharges from the orifices 51 will be intermittent through the slot 53 in the sleeve. A flexible pipe 54, from a suitable container, feeds colored plastic in color to the pipe 50 and a gear train 55, including an elongated gear 56, causes 50 to revolve on bearings 57 and reciprocate within sleeve 52 by means of an arm 58 and revolving member 59.

I may use only one such depositing device 50 or as shown in Fig. 4, may locate one above the applicator roll, another above the doctor roll and another within the casing 43, each depositing a different color or different shade of a color. The gear train 55 may be driven by a belt such as 60 connected to the drive of the reverse coating rolls so as to synchronize the action of the depositing device with the travel of the layer 40.

Figure 7:
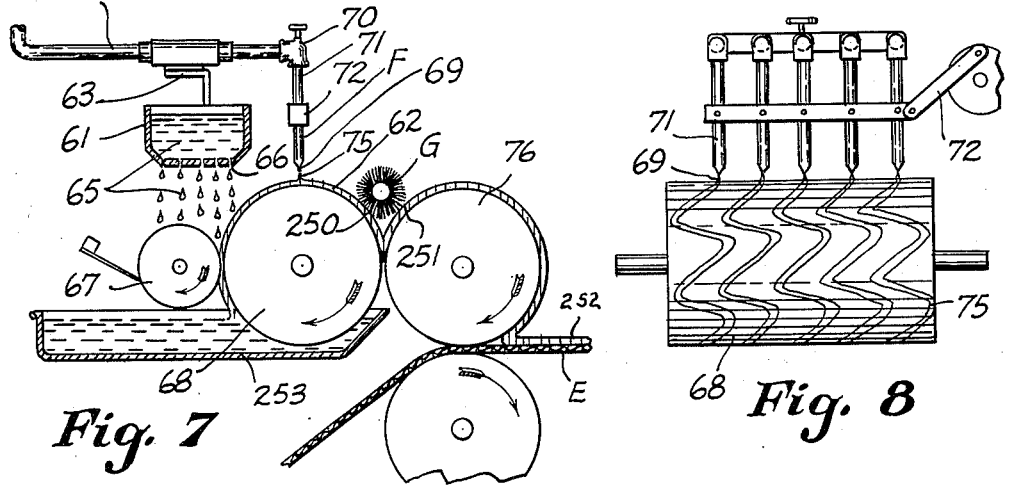
Fig. 7 is a side elevation of the apparatus shown in Fig. 6, both Figs. 6 and 7 showing a brush type mottling member in place of the member shown in previous views.

In Figs. 6 and 7, I show a stationary container 61, which can be mounted above the moving layer 62 in various positions but which I show fixed to a bracket 63, hung from a pipe 64. Container 61 is supplied in any well known manner with viscous flowable plastic, in color, 65 and has irregularly spaced orifices 66 in the bottom thereof to discharge colored plastic droplets on doctor roll 67 and on layer 62 while carried on applicator roll 68. The droplets of plastic assume various shapes depending on the point at which they strike, thus giving variety in the pattern.

My preferred method of depositing by projection is shown at F, wherein the plastic supply pipe 64 containing a plastic of a different color from that in container 61, has an orifice 69 directed at the moving layer 62. A valve and joint 70 is provided, adapted to permit the portion 71 of F to pivot transversely across the layer and to regulate the amount of colored plastic discharged from the orifice. Reciprocating means are provided for 71 including an arm 72, pivoted to a revolving member 73, driven by gear 74 which may be synchronized with the speed of travel of layer 62. As shown in Figs. 6 and 7, orifice 69 discharges a stream 75 of colored plastic in a zig-zag pattern, across predetermined areas of layer 62 and together with droplets of plastic 65 in another color gives a varied multicolor design.

In place of mottling member C, I show a mottling member G, located in the nip of applicator roll 62 and printing roll 76 and comprising a brush roll with irregularly spaced tufts formed of bristles of unequal length. The yielding bristled surface of G contacts the colored viscous plastic deposits at 250 and 251, smearing them into a marbelized pattern indicated at 252.

Layer 62 is formed of viscous flowable plastic in a background color; contained in a coating pan 253, the layer being picked up as it revolves in the pan and the surplus plastic being removed by doctor roll 67.

Figure 8:
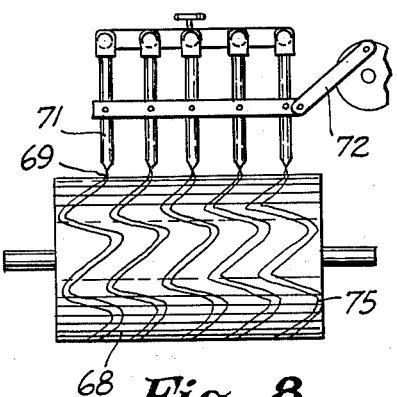
Fig. 8 is a fragmentary front elevation of a plurality of swinging supply pipes showing the zig-zag patterns formed by the plastic on the roll.

As shown in Fig. 8, I prefer to provide a plurality of orifices 69 each at the end of a swinging supply pipe 71 and reciprocated by an arm 72, to form a plurality of zig-zag streams 75 all more or less parallel to each other. Upon deposit, the streams 75 may be of pencil width and upon contacting mottling member G are smeared into a wavy appearance known in the trade as the "marbelized" pattern. Pipes 71 may be about one quarter inch in diameter, with a pet cock type of orifice and, because of the viscosity of the colored plastic, discharge a round stream about one thirty-second of an inch in diameter.

Printing roll 76 preferably runs at least three times faster than the plastic receiving member E, and transfers the colored plastic by reverse coating, with a wiping effect causing a piling up of plastic which levels off the layer and its colored deposits. I thus overcome any unevenness or roughness caused by the deposit of one viscous plastic on another and caused by the contact with the yielding surface of my mottling member without the use of doctor blades, doctor rolls or similar devices.

Figure 9:
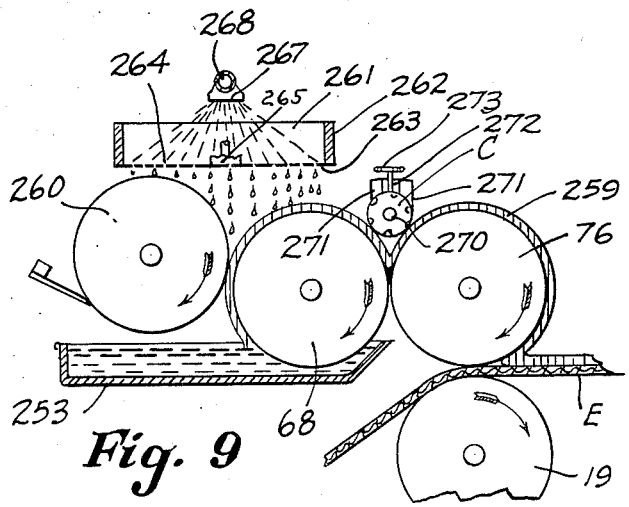
Fig. 9 is a view similar to Fig. 7 of still another modification of my depositing device comprising a screen mounted to revolve above the moving layer and having a spray of plastic directed against the screen. Pressure means for pressing the mottling member against the layer are also shown.

In Fig. 9, I show still another method of depositing by projecting, in which a coating pan 253 forms a layer 259 on applicator roll 68, printing roll 76 and web E. I provide a doctor roll 260 of comparatively large diameter, for stripping surplus plastic from roll 68 and also for receiving deposits of colored plastic. A member 261 is mounted above doctor roll 260 and applicator roll 68, and comprises side walls 262, and a bottom 263 having a plurality of orifices 264, formed between the crossed wires of screening. 261 may be stationary, or may be mounted to revolve about a pivot 265, thus scattering the droplets discharged through the orifices 264.

A spray of viscous plastic from a spray head 267, fed by a supply pipe 268 is directed against the upper side of the screen and forms droplets thereon which pass through the orifices 264 and drop on various areas of doctor roll 260 and layer 259. They assume varied shapes such as round or oval and the droplets striking roll 260 are transferred to layer 259 by a reverse coating action, to mingle with other droplets which have fallen on the layer.

I show a mottling member C, located in the nip or rolls 68 and 76, having a shaft 270, carried between vertical guides 271, 271. A screw type press 272, having a turning wheel 273 is associated with C, to adjust the amount of contact pressure as desired.

The hardened plastic web produced by the devices shown in Figs. 1 to 9 may be cut up with a slitter and fly cutter into squares such as nine inches by nine inches and the squares may be laid in checkerboard fashion to form an attractive pattern. The variegated squares may alternately run in one direction and then the other in the manner of the well known asphalt tile now popular in the trade. Of course, other small and large sections, of regular or irregular outline may be cut from the hardened plastic web to be assembled into a complete floor covering or the like in many possible combinations.

In Figs. 10 and 11, one form of device for depositing flowable plastic by application on a moving layer is shown consisting of revolving rolls in contact with the layer. A printing roll 80 is provided, in reverse coating contact with plastic receiving member E, and an applicator roll 81 is associated therewith, having a coating pan 82 for a background plastic J. A mottling member C is located in the nip of rolls 80 and 81 and a roll 83, acts as the doctor roll for roll 81. 84 is a design roll, having a suitable design 87 either raised from, or sunken into, the surface thereof and 85 is the applicator roll for 84 while 86 is the doctor roll for roll 85.

Roll 85 picks up a film of colored flowable plastic K, from coating pan 88, transfers it to the design 87, whence it is transferred to roll 83 and then applied in flowable condition to the flowable plastic background color J on roll 81. Passing under mottling member C, the colored plastics are suitably streaked or stippled and if the contact pressure of C is sufficient, K may be pressed into J enough to be evident on the underside thereof. The reverse coating action of roll 80 as it delivers K and J to the plastic receiving member E, smooths or irons out the upper surface of the plastic since the roll 80 is traveling faster than E and therefore builds up a thick film of a uniform depth on E.

As shown in Fig. 12, in place of a design roll such as 84, I can use a design belt such as 90 of a flexible material and carried on rolls 91 and 92. An applicator roll 93, doctor roll 94 and coating pan 95 for flowable plastic M is provided to transfer a film of plastic M to the design elements 96 carried by design belt 90. One or more additional design belts 97, with design elements 98 may also be provided depending on the complexity of the design, each transferring its colored plastic to a roll such as 99. By the use of such design belts, an accurate repeat pattern in flowable plastic can be assembled on roll 99, to be transferred onto background J, mottled therewith by C and hardened into the final covering material in D.

As shown in Fig. 13, I can deposit by application directly on plastic receiving member E by means of revolving design members 84 and 104 bearing designs 87 and 107. In addition to doctor roll 86, applicator roll 85, design roll 84 and coating pan 88 for depositing plastic K, I can use one or more additional design batteries for depositing the remainder of the design elements such as doctor roll 106, coating pan 108, applicator roll 105, and design roll 104, with design 107 for a colored plastic such as P. After depositing the colored plastic pattern made up of designs in plastic K and P, I pass the member E under a revolving member L, which may be a mottling member or a doctor roll and thence through a setting device D.

I claim:

1. In a machine for continuously making variegated hardened sheet material from viscous flowable plastic, the combination of layer-forming means including a plurality of adjacent rolls, each revolving in the same direction, adapted to form a moving, continuous, undulating layer of viscous flowable plastic in a background color; depositing means, associated with said layer-forming means, adapted to deposit viscous, flowable plastic in a contrasting color on said undulating layer; smoothing means, comprising the end roll of said layer-forming means in reverse coating contact with a moving plastic-receiving surface, adapted to smooth said layer as it is delivered to said surface and a moving plastic receiving surface extending from said smoothing means into a plastic hardening device.

2. In a machine for continuously making variegated hardened sheet material from viscous, flowable plastic, the combination of layer-forming means including a plurality of adjacent rolls, each revolving in the same direction, adapted to form a moving, continuous, undulating layer of viscous, flowable plastic in a background color; depositing means, located over said layer-forming means, adapted to project viscous, flowable plastic in a contrasting color on said undulating layer; smearing means, comprising a revolving mottling member adapted to contact said undulating layer and arranged to reciprocate transversely thereof; smoothing means comprising the end roll of said layer-forming means in reverse coating contact with a moving plastic-receiving surface, adapted to smooth said layer as it is delivered to said surface and a moving plastic-receiving surface extending from said smoothing means into a plastic hardening device.

3. In a machine for continuously making variegated hardened sheet material from viscous, flowable plastic in substantially repeated multi-color patterns, the combination of layer-forming means including a plurality of adjacent rolls, each revolving in the same direction, adapted to form a moving, continuous, undulating layer of viscous, flowable plastic in a background color; depositing means, located over said layer-forming means, adapted to repeatedly project viscous, flowable plastic, in color contrasting to said background color, on said undulating layer in substantially repeated patterns; smearing means, comprising a revolving mottling member adapted to contact said undulating layer and to reciprocate transversely thereof in synchronization with the travel of said layer; smoothing means, comprising the end roll of said layer-forming means, in reverse coating contact with a moving plastic-receiving surface, adapted to smooth said layer as it is delivered to said surface and a moving plastic receiving surface extending from said smoothing means into a plastic hardening device.

4. In a machine for continuously making hardened sheet material from viscous, flowable plastic, the combination of an applicator roll adapted to reverse coat a layer of viscous, flowable plastic in a background color onto a printing roll; a printing roll adapted to reverse coat said layer of plastic onto a moving plastic receiving surface; depositing means adapted to deposit viscous, flowable plastic in a color contrasting to said background color, in a variegated design on said layer of background colored plastic while said layer is carried on the applicator and printing rolls and means for hardening the plastic layer and deposits while on said plastic receiving surface.

5. In a machine for continuously making hardened sheet material from viscous, flowable plastic, the combination of an applicator roll adapted to reverse coat a layer of viscous, flowable plastic in a background color onto a printing roll; a printing roll adapted to reverse coat said layer of plastic onto a moving plastic receiving surface; depositing means adapted to deposit viscous, flowable plastic in a color contrasting to said background color, in a variegated design on said layer of background colored plastic while said layer is carried on the applicator and printing rolls; a mottling member, adapted to revolve in contact with said layer and deposits and to reciprocate transversely thereof and means for hardening the plastic layer and deposits, while on said plastic receiving surface.

6. In a machine for continuously making hardened sheet material from viscous, flowable plastic, the combination of an applicator roll adapted to reverse coat a layer of viscous, flowable plastic in a background color onto a printing roll; a printing roll adapted to reverse coat said layer of plastic onto a moving plastic receiving surface; depositing means adapted to project viscous flowable plastic in a color contrasting to said background color, onto said background layer of plastic carried on the applicator and printing rolls, said depositing means comprising a pipe with an orifice located above said roll-carried layer, arranged to reciprocate transversely of said layer and means for hardening the plastic layer and deposits while on said plastic receiving surface.

7. In a machine for continuously making hardened sheet material from viscous, flowable plastic, the combination of an applicator roll adapted to reverse coat a layer of viscous, flowable plastic in a background color onto a printing roll; a printing roll adapted to reverse coat said layer of plastic onto a moving plastic receiving surface; depositing means adapted to project viscous, flowable plastic in a color contrasting to said background color, onto said background layer of plastic carried on the applicator and printing rolls, said depositing means comprising a perforated container, mounted above said roll-carried layer, and arranged to project droplets of contrasting colored plastic onto said roll-carried layer and means for hardening the plastic layer and deposits while on said plastic receiving surface.

8. In a machine for continuously making hardened sheet material from viscous, flowable plastic, the combination of an applicator roll adapted to reverse coat a layer of viscous, flowable plastic in a background color onto a printing roll; a printing roll adapted to reverse coat said layer of plastic onto a moving plastic receiving surface; depositing means adapted to project viscous, flowable plastic in a color contrasting to said background color, onto said background layer of plastic carried on the applicator and printing rolls, said depositing means comprising a perforated container, mounted to revolve in a horizontal plane above said roll-carried layer and a spray pipe, adapted to spray said contrasting colored plastic at the perforations in said container and means for hardening the plastic layer and deposits while on said plastic receiving surface.

9. In a machine for continuously making hardened sheet material from viscous, flowable plastic, the combination of an applicator roll adapted to reverse coat a layer of viscous, flowable plastic in a background color onto a printing roll; a printing roll adapted to reverse coat said layer of plastic onto a moving plastic receiving surface; depositing means adapted to project viscous, flowable plastic in a color contrasting to said background color, onto said background layer of plastic carried on the applicator and printing rolls, said depositing means comprising a perforated pipe, mounted to revolve within a fixed sleeve, said sleeve having a discharge slot extending transversely of said layer and means for hardening the plastic layer and deposits while on said plastic receiving surface.

10. The process of continuously producing decorative floor covering having a layer of hardened variegated plastic mounted on a web of backing material which comprises the steps of first forming a moving, undulating, continuous layer of viscous, flowable plastic in a background color; then depositing viscous flowable plastic, in a contrasting color, on said moving, undulating continuous layer; then reverse coating said viscous, flowable layer and deposits onto a moving web of backing material and then hardening said layer and deposits on said web.

11. The process of continuously producing decorative floor covering having a layer of hardened plastic, in a marbelized design, mounted on a web of backing material which comprises the steps of first forming a moving, undulating, continuous layer of viscous, flowable plastic in a background color; then depositing viscous, flowable plastic in a contrasting color on said moving undulating, continuous layer; then mottling said deposits by smearing the same in a direction transverse to the travel of the layer; then smoothing said viscous, flowable plastic by reverse coating the layer and its smeared deposits onto a moving web of backing material and then hardening said smoothed layer of viscous, flowable plastic on said web.

12. A machine as specified in claim 4 wherein said depositing means comprises a rotating member adapted to reverse coat plastic designs in a contrasting color onto said layer of background colored plastic while said layer is carried on the applicator and printing rolls.

FRED CHARLES SCHUELER.

REFERENCES CITED

The following references are of record in the file of this patent:

UNITED STATES PATENTS

| Number | Name | Date |
|---|---|---|
| 693,759 | Tonjes | Feb. 18, 1902 |
| 1,437,872 | Tamberlin | Dec. 5, 1922 |
| 1,750,567 | Campbell | Mar. 11, 1930 |
| 1,763,314 | McConoughey | June 10, 1930 |
| 1,854,666 | Prifold | Apr. 19, 1932 |
| 1,939,961 | Emig | Dec. 19, 1933 |
| 2,218,811 | Chaussabel | Oct. 22, 1940 |
| 2,241,051 | Berger | May 6, 1941 |
| 2,310,495 | Symmersgill | Feb. 9, 1943 |
| 2,318,272 | Weigle et al. | May 4, 1943 |
| 2,368,475 | Kemmler | Jan. 30, 1945 |
| 2,374,940 | Kemmler et al. | May 1, 1945 |
| 2,455,777 | Jones | Dec. 7, 1948 |